United States Patent
Chaiko (10) Patent No.: US 7,214,734 B2
(45) Date of Patent: May 8, 2007

(54) LIQUID CRYSTALLINE COMPOSITES CONTAINING PHYLLOSILICATES

(75) Inventor: David J. Chaiko, Naperville, IL (US)

(73) Assignee: UChicago Argonne, LLC, Chicago, IL (US)

(*) Notice: Subject to any disclaimer, the term of this patent is extended or adjusted under 35 U.S.C. 154(b) by 441 days.

(21) Appl. No.: 10/863,617

(22) Filed: Jun. 8, 2004

(65) Prior Publication Data

US 2005/0020751 A1   Jan. 27, 2005

Related U.S. Application Data

(62) Division of application No. 09/973,302, filed on Oct. 9, 2001, now Pat. No. 6,762,233.

(51) Int. Cl.
*C08K 3/34* (2006.01)

(52) U.S. Cl. ............... 524/445; 524/446; 524/447; 524/502; 524/755; 524/765; 501/145

(58) Field of Classification Search ............... 524/446, 524/447, 445, 755, 502, 765; 523/201
See application file for complete search history.

(56) References Cited

U.S. PATENT DOCUMENTS

| | | | |
|---|---|---|---|
| 4,810,734 A | 3/1989 | Kawasumi et al. | |
| 4,816,517 A | 3/1989 | Wilkus et al. | |
| 5,430,566 A * | 7/1995 | Sakaya et al. | 349/118 |
| 5,552,469 A | 9/1996 | Beall et al. | |
| 5,554,670 A | 9/1996 | Giannelis et al. | |
| 5,645,758 A | 7/1997 | Kawasumi et al. | |
| 5,698,624 A | 12/1997 | Beall et al. | |
| 5,726,247 A | 3/1998 | Michalczyk et al. | |
| 5,747,560 A | 5/1998 | Christiani et al. | |
| 5,840,796 A | 11/1998 | Badesha et al. | |
| 5,876,812 A | 3/1999 | Frisk et al. | |
| 5,910,523 A | 6/1999 | Hudson | |
| 5,962,553 A | 10/1999 | Ellsworth | |
| 6,034,163 A | 3/2000 | Barbee et al. | |
| 6,060,549 A | 5/2000 | Li et al. | |
| 6,084,019 A | 7/2000 | Matayabas, Jr. et al. | |
| 6,103,817 A | 8/2000 | Usuki et al. | |
| 6,136,908 A | 10/2000 | Liao et al. | |
| 6,156,835 A | 12/2000 | Anderson et al. | |
| 6,172,121 B1 | 1/2001 | Chaiko | |
| 6,225,374 B1 | 5/2001 | Vaia et al. | |
| 6,262,162 B1 | 7/2001 | Lan et al. | |
| 6,271,297 B1 | 8/2001 | Ishida | |
| 6,271,298 B1 | 8/2001 | Powell | |
| 6,403,231 B1 | 6/2002 | Mueller et al. | |
| 6,521,678 B1 | 2/2003 | Chaiko | |
| 6,555,610 B1 | 4/2003 | Blanton et al. | |
| 6,632,868 B2 * | 10/2003 | Qian et al. | 524/445 |
| 6,759,463 B2 | 7/2004 | Lorah et al. | |
| 6,790,896 B2 | 9/2004 | Chaiko | |
| 6,822,035 B2 | 11/2004 | Chaiko | |
| 6,841,226 B2 | 1/2005 | Dontula et al. | |
| 6,864,308 B2 * | 3/2005 | Rosenthal et al. | 524/445 |
| 2003/0176537 A1 | 9/2003 | Chaiko | |

OTHER PUBLICATIONS

Jordan, John W., "Organophilic Bentonites," *J. Phys. Colloid Chem.*, vol. 53, pp. 294-306, 1949, published by Baltimore, Williams & Wilkins Co.

Kawasumi, M., et al., "Liquid Crystalline Composite Based on a Clay Mineral," *Mol. Cryst. Liq. Cryst.*, vol. 281, pp. 91-103, 1996, published by Gordon and Breach Science Publishers SA, printed in Malaysia.

Kawasumi, M., et al., "Preparation and Mechanical Properties of Polypropylene—Clay Hybrids," *Macromolecules*, vol. 30, pp. 6333-6338, 1997, published by American Chemical Society.

Hasagawa, N., et al., "Preparation and Mechanical Properties of Polypropylene-Clay Hybrids Using a Maleic Anhydride-Modified Polypropylene Oligomer," *J. Appl. Poly. Sci.*, vol. 67, pp. 87-92, 1998, published by John Wiley & Sons, Inc.

* cited by examiner

*Primary Examiner*—Katarzyna Wyrozebski
(74) *Attorney, Agent, or Firm*—Foley & Lardner LLP (57) ABSTRACT

The present invention provides barrier films having reduced gas permeability for use in packaging and coating applications. The barrier films comprise an anisotropic liquid crystalline composite layer formed from phyllosilicate-polymer compositions. Phyllosilicate-polymer liquid crystalline compositions of the present invention can contain a high percentage of phyllosilicate while remaining transparent. Because of the ordering of the particles in the liquid crystalline composite, barrier films comprising liquid crystalline composites are particularly useful as barriers to gas transport.

21 Claims, 6 Drawing Sheets

LIQUID CRYSTALLINE COMPOSITES CONTAINING PHYLLOSILICATES

RELATED APPLICATIONS

The present application is a divisional of U.S. patent application Ser. No. 09/973,302, filed Oct. 9, 2001, now U.S. Pat. No. 6,762,233.

STATEMENT REGARDING FEDERALLY SPONSORED RESEARCH

The U.S. Government has rights in this invention pursuant to Contract No. W-31-109-ENG-38 between the United States Department of Energy and the University of Chicago representing Argonne National Laboratory.

FIELD OF THE INVENTION

This invention relates to liquid crystalline compositions comprised of phyllosilicates and polymers. More particularly, this invention relates to liquid crystalline compositions for use in barrier applications.

BACKGROUND OF THE INVENTION

It is common practice to blend materials such as mica, talc, kaolin, precipitated calcium carbonate, precipitated silica, fumed silica, barite, zinc oxide, carbon black, etc. into elastomeric, thermoset, and thermoplastic polymers. Inorganic fillers are added as high as 40 to 50 weight percent. The addition of minerals to polymers can improve properties such as strength, stiffness, temperature and impact resistance, dimensional stability, and scratch resistance. In conventional mineral/polymer composite materials, the mineral phases are dispersed within the polymer matrix at the micrometer scale.

Much interest has been created by the more recent advance of producing nanocomposites. Nanocomposites—nanometer sized dispersions of organophilic clays in polymers to form polymeric hybrids—have been demonstrated to produce dramatic improvements in mechanical properties, heat resistance, thermal stability, and reduced gas permeability of the base polymer without loss of impact strength. Due to their enhanced barrier properties and clarity, nanocomposites are well suited for use as gas transport barriers in packaging applications. Examples include nylon-based nanocomposites for food and beverage packaging which incorporate the nanocomposite layer within single or multilayer films. Reduction in gas diffusion is attributed to the presence of the clay particles which act to increase diffusion path length. Current nanocomposites characteristically contain small amounts of phyllosilicates dispersed in the base polymer, typically six percent or less, producing overall improvements in reduction of gas transfer that can be calculated from simple diffusion theory and which depend on the generation of a tortuous diffusion path originating from the presence of the dispersed organoclay. A major impediment to the commercial development of nanocomposites has been the difficulty of producing homogenous dispersions of organoclays within the polymer matrix. To improve the affinity between the hydrophilic clay surface and organic polymers, clays are treated by cation exchange with high-molecular-weight onium salts (e.g., ammonium, phosphonium, and sulfonium). However, even with surface treatment, phyllosilicates can still only be dispersed at the nanoscale into polymers that contain polar functional groups. The presence of these polar functional groups makes high barrier polymers, such as PET, EVOH, and Nylon, sensitive to water, thus requiring their use as multilayer laminates which contain an external, water-barrier layer. The requirement of multilayer laminates thus increases manufacturing costs of flexible packaging films.

Accordingly, there is a continuing need to provide low cost materials which provide superior barriers against gas transport and diffusion.

SUMMARY OF THE INVENTION

One embodiment of the present invention provides a phyllosilicate-polymer composition comprised of a phyllosilicate and a polymer layer adsorbed onto the basal surface of the phyllosilicate providing a phyllosilicate-polymer composition. In the phyllosilicate-polymer composition the phyllosilicate-polymer composition is present as a single phyllosilicate-polymer phase and exhibits an anomalous basal spacing. Preferably a sufficient proportion of exchange sites on the basal surface of the phyllosilicate are substantially occupied by protons. In other embodiments of the invention the polymer has at least one hydroxyl group and can be selected from the group consisting of polyethylene glycol, polypropylene glycol and their monoalkyl ether derivatives. Still other embodiments of the invention provide phyllosilicate-polymer compositions wherein the polymer comprises greater than 27 weight percent of the phyllosilicate-polymer composition, the basal surface of the phyllosilicate is bound substantially with hydrogen ions or the basal spacing of the phyllosilicate-polymer composition increases as the molecular weight of the polymer increases. In yet another embodiment, the basal spacing of the phyllosilicate-polymer composition is equal to or greater than 17.8 Å.

Still another embodiment of the present invention provides an anisotropic liquid crystalline composite comprising a phyllosilicate-polymer composite made of at least a phyllosilicate, and a polymer adsorbed onto the basal surface of the phyllosilicate. In this embodiment the phyllosilicate-polymer composite has a highly ordered, well-defined basal spacing and the phyllosilicate-polymer composition is birefringent. Other aspects of this embodiment of the invention include a nematically oriented phyllosilicate in the phyllosilicate-polymer composition. In this embodiment, the phyllosilicate can make up greater than 10 percent of the phyllosilicate-polymer composite. Typically, the phyllosilicate is selected from the group consisting of kaolins, talcs and montmorillonites and the polymer is water soluble. In another embodiment the polymer can be hydrophobic, such as polyethylene. The anisotropic liquid crystalline composite of this embodiment can further comprise an antioxidant. In still another embodiment of the invention the anisotropic liquid crystalline composite comprises a barrier layer such that the barrier layer provides a gas permeability below the gas permeability of the polymer alone.

The present invention also provides methods for producing an anisotropic liquid crystalline composite from a phyllosilicate and a polymer. The method can include the steps of suspending a phyllosilicate in a compatible solvent, dissolving a polymer that is soluble in the compatible solvent, and removing a sufficient amount of the compatible solvent to produce an anisotropic liquid crystalline composite. In the method the solvent can be water and the polymer polyethylene glycol. The method can further include the step of purifying the phyllosilicate prior to suspending the phyllosilicate in the compatible solvent. The method can provide an anisotropic liquid crystalline composition comprising between about 10 and 70 percent phyllosilicate. The method also provides composites which are extrudable and useful as gas barrier layers.

In yet another embodiment of the present invention, a barrier film for use in packaging and coating applications is provided having reduced gas permeability. The barrier film comprises an anisotropic liquid crystalline composite layer having a gas permeability below the permeability of the polymer alone. Typically the film is transparent and is comprised of a phyllosilicate and a polymer or a combination of polymers. The phyllosilicate can make up greater than ten percent by weight of the liquid crystalline composite layer. The barrier film of the present invention can also be incorporated into other films as a barrier layer to form a multilayer film. As a non-limiting example, the liquid crystal composite can be blended with polyethylene to impart water barrier properties and improve extrusion properties.

The above described embodiments are set forth in more detail in the following description and illustrated in the drawings described hereinbelow.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF THE INVENTION

The present invention provides liquid crystal composites comprised of phyllosilicate-polymer compositions and methods of making the liquid crystal composites. Liquid crystal composites of the present invention can contain minimal amounts of phyllosilicate, on the order of one percent or less by weight, up to about 70% phyllosilicate by weight. The technique utilized in the present invention involves intercalating a polymer within the galleries of a phyllosilicate which is preferably a purified clay material. Examples of suitable clay minerals include: kaolins, talcs, saponites and montmorillonites as non-limiting examples. Intercalation of the polymer within the phyllosilicate can occur according to several methods. As will be well understood by one skilled in the art, phyllosilicates inherently have basal surfaces and are arranged in layers of phyllosilicate particles which are stacked on top of one another. The stacking of the phyllosilicates provides interlayers or galleries between the phyllosilicate layers. These galleries are normally occupied by cations, typically comprising sodium, potassium, lithium, calcium, magnesium ions and combinations thereof, that balance the charge deficiency generated by the isomorphous substitution within the phyllosilicate layers. Typically, water is also present in the galleries and tends to associate with the cations. The distance between the basal surfaces of adjacent phyllosilicate layers is referred to as the basal spacing.

A preferred method involves dispersing the phyllosilicate in a compatible solvent, dispersing or dissolving the polymer in the compatible solvent and then removing enough of the solvent to produce a liquid crystalline composite of phyllosilicate and polymer. Compatible solvents as used in the present invention mean solvents, either neat or in admixtures, in which the phyllosilicate and polymer is capable of being dispersed or suspended and preferably solvents in which the polymer is soluble. The preferred solvent according to the present invention is water, although other solvents in which phyllosilicates and polymers can be dispersed are suitable for use in the present invention. Accordingly, preferred polymers can be water soluble or not soluble in water. Preferred polymers also have at least one hydroxyl group. After the solvent is removed, the phyllosilicate-polymer mixtures produce a self-assembled liquid crystal structure. Typically, the phyllosilicate is nematically ordered within the liquid crystalline composite. Surprisingly and unexpectedly, liquid crystalline composites provide excellent resistance to gas transport. With proper modification, the liquid crystalline compositions of the present invention can be made to be extrudable, their water sensitivity can be adjusted, and by incorporating the proper functionality, can be made to function as both a barrier layer and as an adhesive material for multilayer laminates and films.

Without limiting the scope of the invention, it has been surprisingly found that polymer intercalation to levels sufficient to increase the gallery spacing to at least 19 Å produces composites that are extrudable. Water sensitivity of the liquid crystalline composite can be reduced by co-adsorption of ethylene-co-acrylic acid polymers. Ethylene-co-acrylic acid polymers with at least 15–20% acrylic acid content are water soluble and under low pH conditions bond directly to the phyllosilicate surface. A high degree of water resistance can be achieved by inhibiting the neutralization of the acid functionality to less than about 3%.

Another method for intercalating a polymer within the galleries of the phyllosilicate involves mixing the phyllosilicate and the polymer together and then heating the phyllosilicate-polymer mixture to a temperature above the melting temperature of the polymer. According to this method the polymer intercalates into the galleries of the phyllosilicate thus producing a liquid crystalline composite.

The liquid crystalline composite formed by the intercalation of the phyllosilicate with the polymer can itself be intercalated with a second polymer, such as polyethylene or modified polyethylene, to form a liquid crystalline composite comprising more than one polymer intercalated within the galleries of the phyllosilicate. Alternatively, two or more polymers can be mixed with the phyllosilicate in the initial step of forming the liquid crystalline composite and then heated to a temperature above the melting temperature of the polymer. Utilizing additional polymers in the liquid crystalline composite can impart desirable properties to the liquid crystalline composite including water resistance, extrudability and adhesive properties.

The present phyllosilicate-polymer liquid crystal composites can be used as ultra-high-barrier films for packaging and coatings applications in the form of either extrudable liquid crystalline composites or as cast, thin-film liquid crystalline composite applied to a substrate, preferably a polymeric substrate (e.g. PET). Liquid crystalline composites, preferably exhibiting a nematic structure and containing high concentrations of clays, offer greater resistance to gas diffusion due to very high concentrations of overlapping, impermeable clay platelets. The clay concentrations within the liquid crystalline composite are in one embodiment in the range of 10 to 70 weight percent, and in other embodiments 10 to 30, 30 to 50 or 50 to 70 weight percent depending upon the application in which the liquid crystalline composite is used. The barrier layers of the present invention provide resistance to gas permeability which is greater than the gas resistance of the base polymer alone. Preferably, the barrier layers of the present invention provide gas resistance which is 1.5 times or more than the base polymer. More preferably, the barrier layers provide resistance to gas diffusion ranging from about ten times greater and up than the base polymer. Most preferably, the barrier layers provide gas resistance that is from about 1,000 to about 1,000,000 times greater when compared to barrier layers made of the base polymer without the phyllosilicate.

A particularly interesting class of liquid crystalline composites can be prepared from purified smectites onto which low-molecular-weight polyethylene glycols are adsorbed at concentrations in excess of 27 weight percent, although the present invention is not limited to such compositions. These liquid crystalline composites are synthesized by adding water-soluble polymers to an aqueous suspension of a phyllosilicate. Removal of the water to less than about 2 weight percent moisture produces self-assembled nematic liquid crystalline composites. Surprisingly and unexpectedly, a liquid crystalline composite containing greater than 27 weight percent polymer, and in particular polyethylene glycol, can be produced which exhibits a single phyllosilicate-polymer phase and is a liquid crystalline composite. This is in contrast to published studies in which polymer loading in excess of 27 weight percent produced two phases—a simple admixture of a polymer-phyllosilicate phase and a crystalline polymer phase. As described below, the single-phase liquid crystalline composites of the present invention containing about 30 to 70 weight percent polymer exhibit unique properties which make them prime candidates for the manufacture of cast and extruded films. Liquid crystalline composites for use in the production of cast and extruded films include those composites which contain 30 to 40 weight percent polymer, 40 to 50 weight percent polymer, 50 to 60 weight percent polymer and 60 to 70 weight percent polymer. Because of their ordered structure, these liquid crystalline composite materials are expected to exhibit excellent resistance to the transport of gases, and in particular oxygen and carbon dioxide, making them good candidates for barrier and packaging applications. In order to mitigate their sensitivity to water vapor, the liquid crystalline composites would be preferably be incorporated as a thin, barrier layer within multi-layer films. These multi-layer films can be produced by attaching a cast film to other polymeric layers or through coextrusion. In an alternative embodiment of the present invention, hydrophobic polymers, such as polyolefins, can be intercalated into the liquid crystal composite to produce a composite which is water resistant. The polyolefin is preferably used in combination with water-soluble polymers and/or coupling agents such as PEG-based surfactants. Preferred hydrophobic polymers include polyolefins, and in particular polyethylene and modified polyethylene. Intercalating a hydrophobic polymer into the galleries of the phyllosilicate can produce a liquid crystalline composite which is hydrophobic and extrudable.

Without limiting the scope of the present invention, it is believed that a single phyllosilicate-polymer phase can be achieved by loading greater than 27 weight percent polyethylene glycol onto a basal surface of the phyllosilicate through adsorbtion the polymer as an oxonium cation. However, the phyllosilicate-polymer compositions of the present invention do not depend upon the proposition that the polymer is adsorbed onto the phyllosilicate as an oxonium ion.

Figure 2:
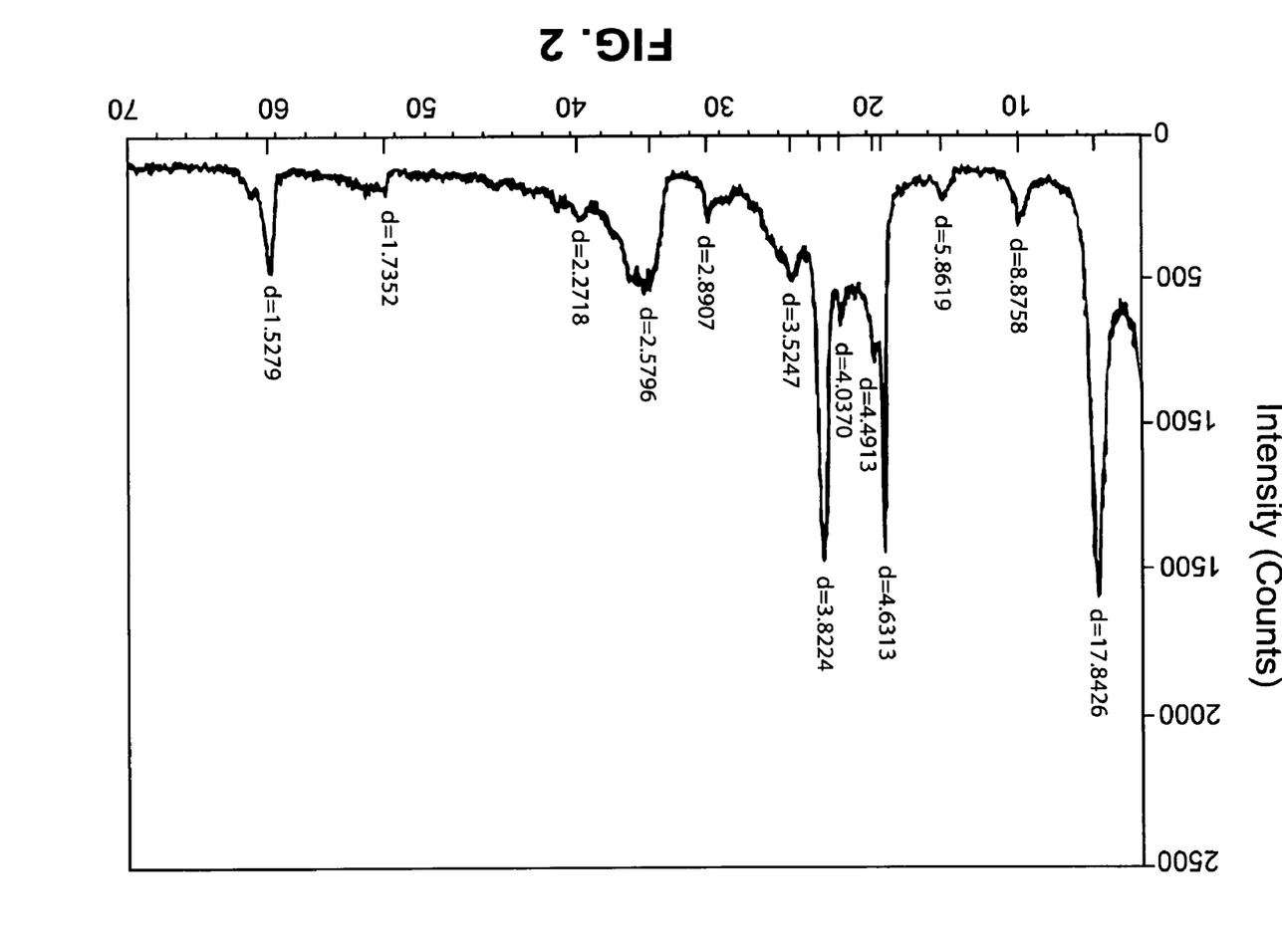
FIG. 2. X-ray diffraction pattern of sodium exchanged saponite admixed with polyethylene glycol at a ratio of 1 g polymer per 1 g of clay.
Figure 3:
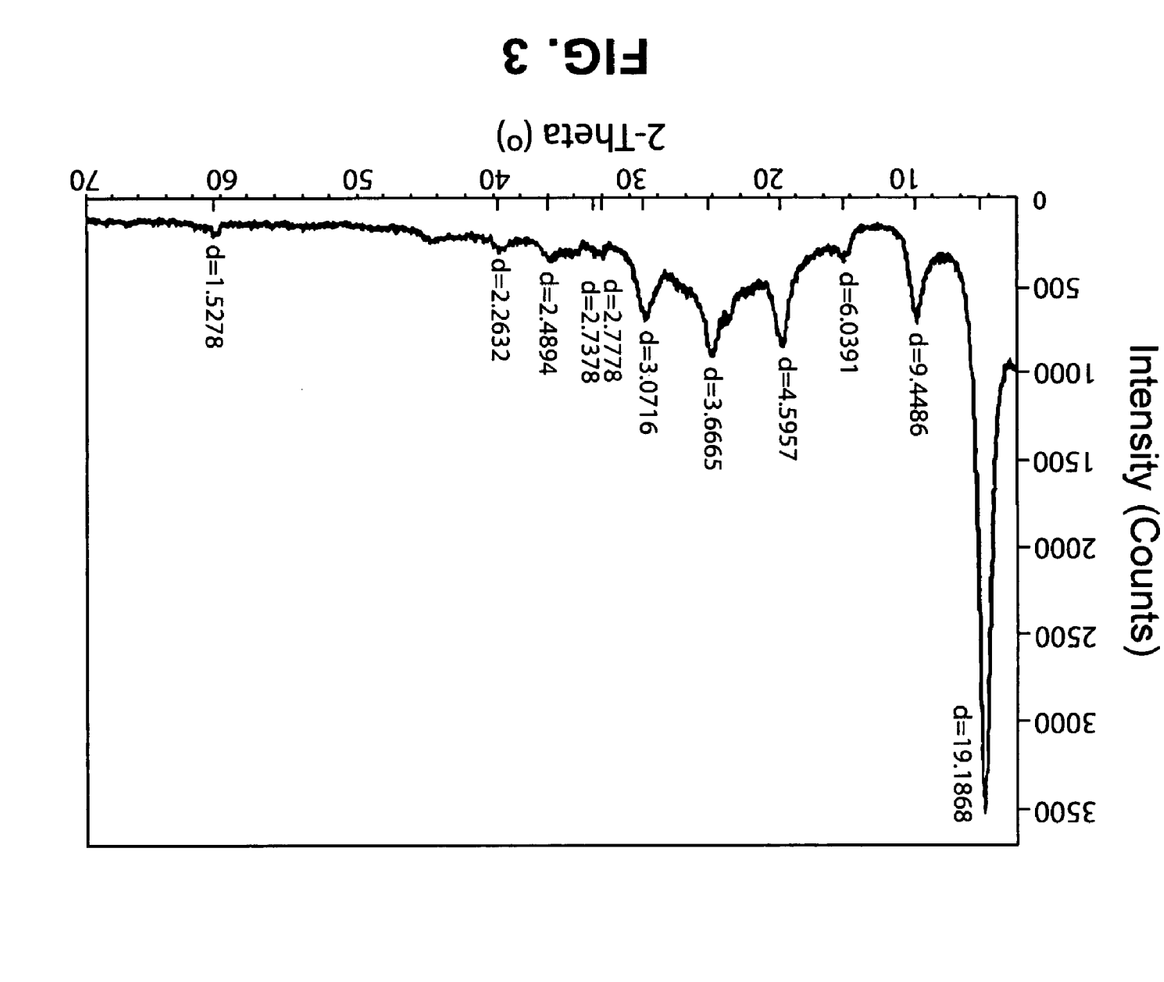
FIG. 3. X-ray diffraction pattern of a liquid crystalline composite containing 50 weight percent polyethylene glycol.

The attachment of polyethylene glycol according to the present invention, theorized to be through oxonium ion exchange, offers a unique method of achieving higher than normal polyethylene glycol loading. A comparison of x-ray diffraction patterns in FIGS. 2 and 3 illustrate the difference between polymer adsorption via ion dipole interaction and the proposed oxonium cation exchange. FIG. 2 shows the x-ray diffraction pattern of a sodium-exchanged saponite admixed with 50 weight percent polyethylene glycol. It displays the expected d(001) spacing of 17.8 Å. However, the diffraction pattern also shows diffraction peaks at 4.63 and 3.83 Å which correspond to a crystalline polyethylene glycol phase. In other words, the admixture is comprised of two discrete phases—a clay/polymer intercalate containing 27 weight percent polymer and a separate crystalline polymer phase not associated with the clay. The x-ray diffraction pattern of the oxonium-exchanged clay containing 50 weight percent polyethylene glycol is shown in FIG. 3. Aside from basal reflections, it does not show diffraction peaks for a crystalline polymer phase. This indicates the existence of only one phase—a clay/polymer intercalate containing 50 weight percent polyethylene glycol.

Published x-ray data indicate that a complete monolayer of polyethylene glycol expands the basal spacing of sodium exchanged smectite clays from 9.5 Å to 17.8 Å. This 8.3 Å increase corresponds to the formation of a double layer structure residing between adjacent clay platelets and thereby indicating a monolayer depth of approximately 4 Å. The 4.0 Å spacing is in agreement with the width of a hydrocarbon chain. Therefore, the intercalates with greater than 17.8 Å spacing contain polyethylene glycol in excess of a monolayer. Without limiting the scope of the invention, the unusually high adsorption density is believed to be driven by solvation of the adsorbed hydrogen ion by polyethylene glycol via formation of oxonium cations at the clay surface. An ion exchange mechanism would produce basal spacings that are dependent upon the molecular weight of the polymer in agreement with experimental data.

Figure 4:
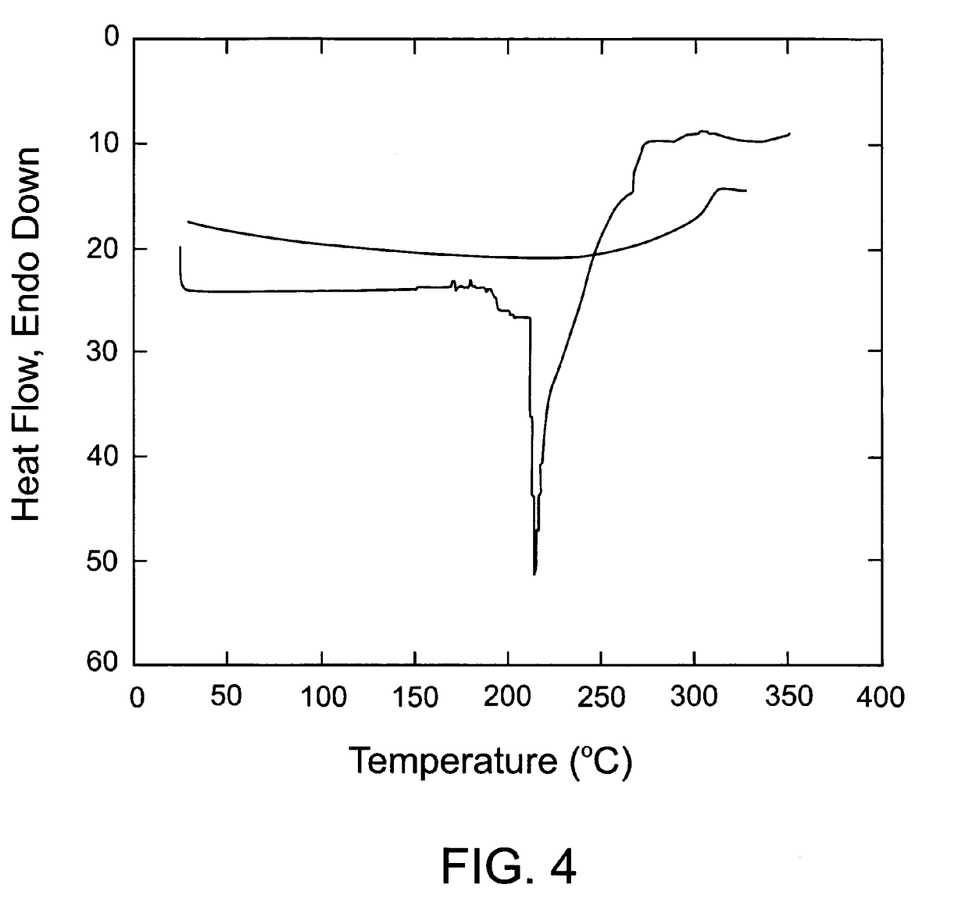
FIG. 4. A differential scanning calorimetry plot of a liquid crystalline composite containing 27 weight percent polyethylene glycol and a basal spacing of 17.3 Å.

Differential scanning calorimetry (DSC) measurements of liquid crystalline composites containing 27, 34, and 50 weight percent polyethylene glycol were conducted to gain further insight into the physicochemical properties of the liquid crystalline composites. FIG. 4 shows the DSC scan for the liquid crystalline composite exhibiting a d(001) spacing of 17.3 Å and produced by oxonium exchange. A melting transition at 43 to 45° C. for the polyethylene glycol (molecular weight of 1500) is notably absent, indicating that the adsorbed polymer is distinctly different from a discrete bulk phase. The scan does, however, show a decomposition endotherm at approximately 215° C. For reference, the decomposition temperature for polyethylene oxide/clay intercalates in an inert atmosphere is approximately 360° C. Without limiting the scope of the invention, the lower decomposition temperature for the liquid crystalline composite is believed to be due to the enhanced molecular motion of the polymer chains that occurs upon melting of the two-dimensional crystal phase located within the clay galleries. This clay, when sodium exchanged and containing 27 weight percent polyethylene glycol, showed the expected decomposition temperature of 360° C.

Figure 5:
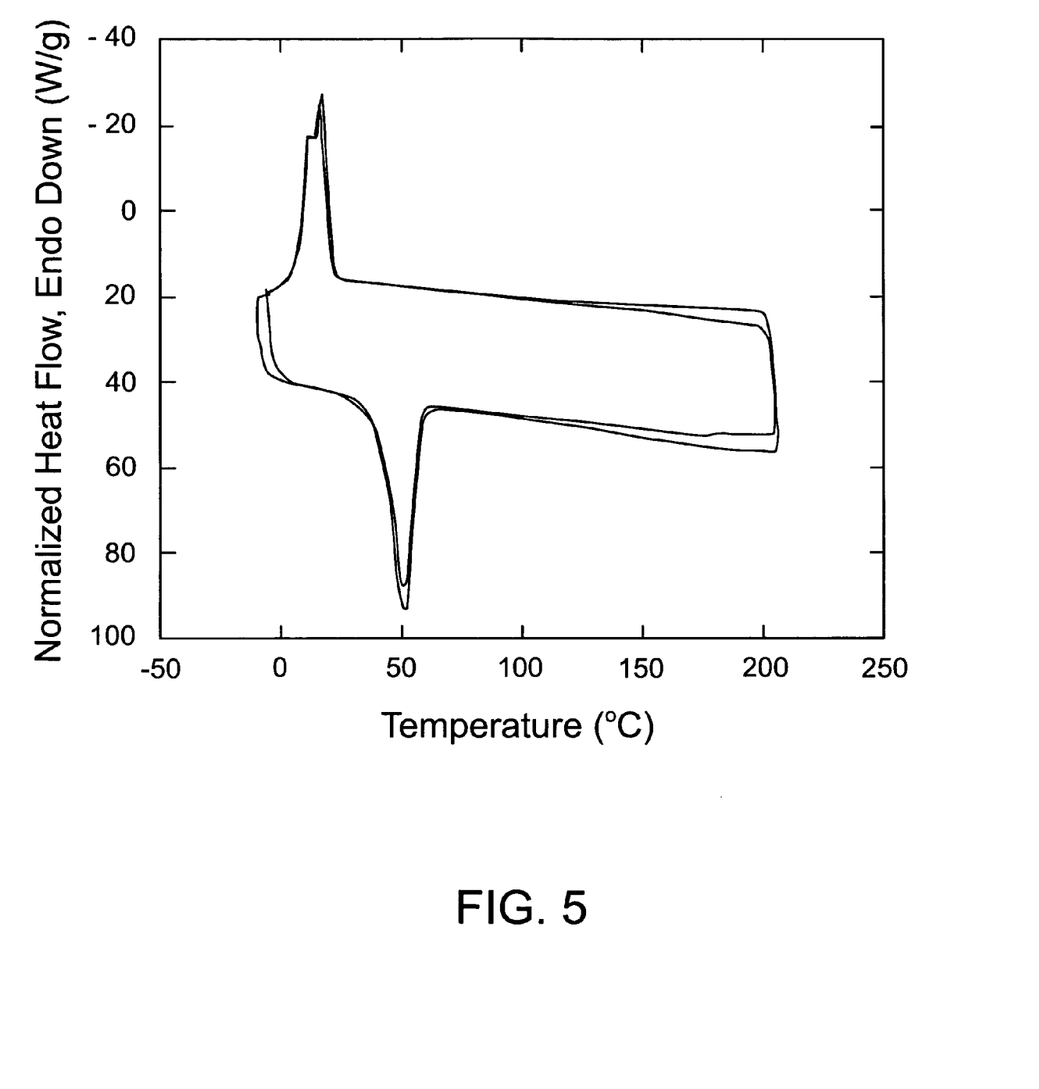
FIG. 5. A differential scanning calorimetry plot of a liquid crystalline composite containing 50 weight percent polyethylene glycol and showing a melt transition at approximately 50° C. and a freezing transition at approximately 15° C.

The DSC data for the liquid crystalline composites containing 32 and 50 weight percent polymer were identical and displayed a reproducible melting transition at approximately 50° C. (the DSC profile for the liquid crystalline composite containing 50 weight percent polymer loading is shown in FIG. 5). These data indicate that the polymer in excess of a monolayer behaves like a discrete, two-dimensional crystalline polymer phase (i.e., displays a melting transition) but the x-ray data indicate that all of the polymer is attached to the basal surface of the clay and therefore does not display a 3-dimensional x-ray diffraction pattern. Note that the observed melt transition of 50° C. is approximately 5–7° C. higher than that of pure polyethylene glycol with identical molecular weight (e.g., 1500). This increase in melt transition has been observed with other polymer systems in confined geometries. Accordingly, the polymer chain segments which undergo a melting transition could produce a lubricating zone thereby enabling the clay platelets to slide past one another under pressure. This would permit extrusion of liquid crystalline composites at temperatures above the melting point (i.e., 50° C.) but below the decomposition point. The decomposition temperature can be increased by extruding in an inert atmosphere and/or by adding an antioxidant to the liquid crystalline composite. Typical antioxidants used to prevent polymer degradation are phenols (e.g, 2,4-Di-t-butyl-4-methylphenol) and aromatic amines (e.g., N,N'-Bis(1-methylheptyl)-p-phenylenediamine).

The film extrusion temperatures of typical packaging polymers such as polyolefins (e.g., polyethylene and polypropylene) and polyethylene terephthalate (PET) are 190° and 280° C., respectively. With the addition of an antioxidant to the liquid crystalline composite it should be possible to co-extrude laminates with polyolefins and PET.

Alternatively, with incorporation of polyethylene glycol based surfactants (e.g., polyethylene-block-polyethylene glycol or polypropylene-block-polyethylene glycol), it is possible to produce extrudable liquid crystalline composites with reduced water sensitivity. Because of their superior characteristics, these materials could be used in single-film barrier applications. The liquid crystalline composites of the present invention are also dispersible in polyolefins making it possible to produce conventional nanocomposites with clay contents of 3–10 weight percent.

Another unexpected feature of the liquid crystalline composites of the present invention is that these phyllosilicate-polymer composites, which have relatively high, typically greater than ten weight percent, phyllosilicate content are transparent. Thus, the liquid crystalline composites of the present invention (provided the resin itself is transparent) are highly desirable in packaging applications. Until now, it has not been possible to produce transparent liquid crystalline composites containing clay minerals at concentrations of ten weight percent or more, especially with extrusion processes.

All references cited herein are hereby incorporated by reference.

Non-limiting examples which further illustrate the properties of the clay-based liquid crystalline composites are provided below.

EXAMPLES

Example 1

This example demonstrates that polyethylene glycol polymer can be loaded at greater than 27 weight percent and still exhibit a single phyllosilicate-polymer phase. Using a Ca-saponite, twenty-seven percent by weight (i.e., 0.27 g of polyethylene glycol per g of clay) was adsorbed onto the basal surface of the saponite by suspending the saponite particles in water, dissolving the PEG in the water and substantially removing the water to form the phyllosilicate-polymer composition. This clay-PEG composition showed an anomalous basal spacing [d(001)], exhibiting a d(001) spacing of 13.6 Å instead of the expected 17.8 Å. As used in the present invention, the phrase "anomalous basal spacing" is used to mean a basal spacing which substantially differs from the basal spacing exhibited by a Wyoming montmorillonite coated with a monolayer, 27 to 30 weight percent, of polyethylene oxide. The polymer loading was verified by Loss on Ignition measurements. The fact that the dried organoclay did not readily disperse in water suggests that the polymer coating was actually less than a monolayer despite the 27 weight percent loading. Sodium exchange improved the colloidal stability of the clay and increased the d(001) spacing to near the expected 17.8 Å. Based on these results it is believed that the presence of hydrogen ions in the exchange sites of the clay caused some of the polyethylene glycol to adsorb onto the clay surface as an oxonium cation rather than through normal ion-dipole interactions between the polymer and the exchangeable cations at the clay surface. This hypothesis is supported by observations that oxonium cation formation by polyethylene glycols has been reported in the solvent extraction literature (J. Rais, E. Sebestova, and M. Kyrs, "Synergistic Effect of Polyethylene Glycols in Extraction of Alkaline Earth Cations by Nitrobenzene," J. Inorg. Nucl. Chem., 38, (1976) pp. 1742–1744). This mechanism of adsorption also offers a plausible explanation for the anomalous d(001) spacing. Without limiting the scope of the invention, it is believed the oxonium cation is produced by protonation of the terminal hydroxyl groups of the polyethylene glycol which are stabilized by formation of a five member ring through hydrogen bonding to the terminal ether oxygen. Loss of hydrated metal ions in the exchange positions on the clay surface would explain the anomalous basal spacing since the volume that would otherwise be occupied by the metal cations now becomes unoccupied.

Example 2

Figure 1:
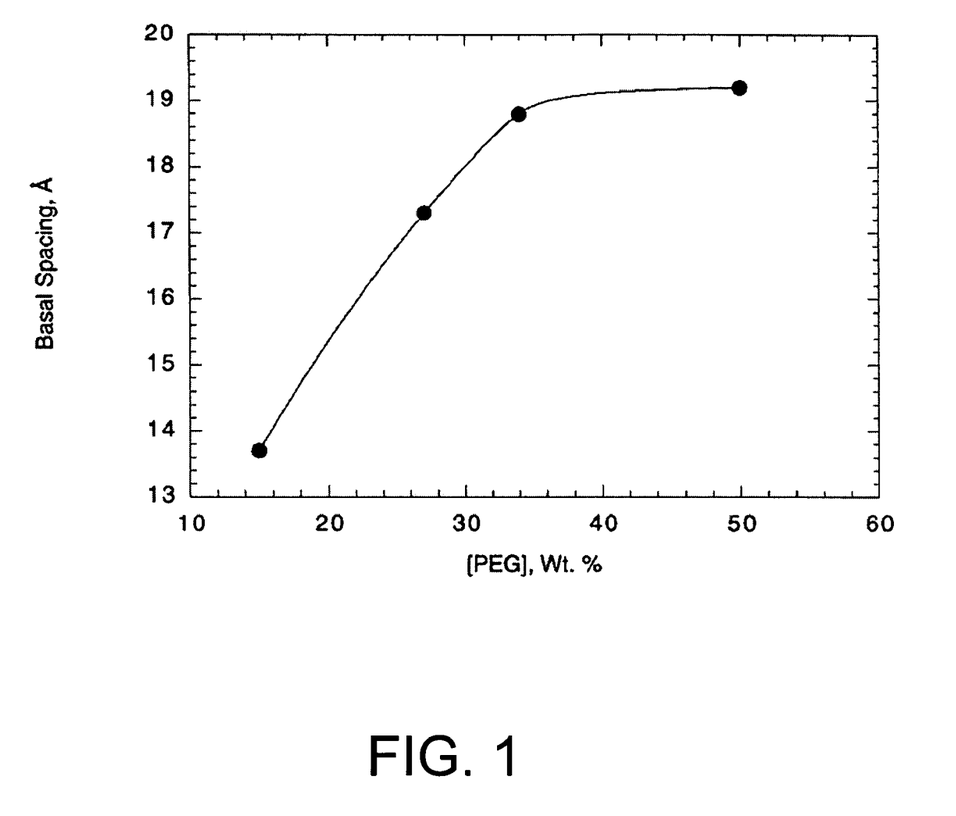
FIG. 1. Basal spacing as a function of polymer loading in liquid crystal composites containing polyethylene glycol.

To test the hypothesis of oxonium cation adsorption, a different saponite was purified using the pseudophasic extraction process described in U.S. patent application, Ser. No. 09/532,728 filed on Mar. 22, 2000, incorporated herein by reference. The purified clay was then treated with a cation-exchange resin in the $H^+$ form to replace the $Na^+$ and $Ca^{++}$ on the clay surface with $H^+$. Varying amounts of polyethylene glycol were then added to aliquots of the clay slurry as described above. The samples were dried overnight at 100° C. producing translucent, birefringent liquid crystalline composite films. The x-ray diffraction patterns were measured to determine the d(001) spacing as a function of polymer loading. The data in FIG. 1 show a plateau in d(001) values at about 19.2 Å and correspond to a polymer loading of about 50 weight percent. This is in contrast to literature data showing a maximum d(001) spacing of 17.8

Å at 27 weight percent polyethylene glycol loading. The 17.8 Å spacing at a polymer loading of 27 to 30 weight percent has been reported in the literature to be independent of polymer molecular weight for all smectites that have been studied. In contrast, oxonium ion exchange produces a basal spacing that increases with increasing polymer molecular weight. These results clearly indicate the importance of hydrogen ion concentration in the clay exchange positions on polymer adsorption behavior. Thus, phyllosilicates which have either a naturally high hydrogen ion concentration in the exchange positions or which have been altered through cation exchange to provide a high hydrogen ion concentration are useful in the present invention.

Example 3

This example demonstrates the excellent oxygen barrier properties of a cast liquid crystalline composite film. A cast liquid crystalline composite film was prepared by drying an aqueous slurry containing approximately 3 weight percent sodium montmorillonite having a monolayer coating of polyethylene glycol (molecular weight 1500) at the ratio 0.27 g polymer per g of clay. The slurry was dried at room temperature producing a flexible film approximately 50 μm thick. Oxygen transport across the film was measured at a relative humidity of zero percent. Oxygen permeability was below detection (i.e. $3 \times 10^{-20}$ mol/m·s·Pa).

The enhanced barrier performance is significantly greater than that expected if the clay platelets merely increased the tortuosity factor and hence the total path length of diffusing oxygen. The reported oxygen permeability for polyethylene oxide is $2 \times 10^{-14}$ mol/m·s·Pa. While the estimated tortuosity factor of the liquid crystalline composite is 20–40 the oxygen permeability in the liquid crystalline composite is reduced by more than 650,000 fold over that of polyethylene oxide.

Example 4

This example illustrates the preparation of an extrudable liquid crystalline composite by using a surfactant to plasticize the polyethylene glycol/clay composite. A commercial hectorite (Bentone Mass.) was purified using the pseudophasic extraction technique. The aqueous slurry, containing approximately 3 weight percent organoclay, was treated with a cation exchange resin to convert the organoclay into the $H^+$ form. The treated slurry was combined with polyethylene-block-polyethylene glycol and heated to 120° C. for 1–5 h to remove water. The final product contained approximately 5 weight percent clay, 2 weight percent polyethylene glycol, and 93 weight percent polyethylene-block-polyethylene glycol. The extremely large amount of surfactant (polyethylene glycol/polyethylene copolymer) used in this example illustrates the ability of the water-dispersed organoclay to adsorb the polymeric surfactant to levels that are well beyond a monolayer coating and to maintain the clay platelet spacing greater than 17.8 Å even after water removal. This is in contrast to the polyethylene glycol (similar molecular weight to the polymeric surfactant) liquid crystalline composites of FIG. 1 which exhibit a plateau in the d(001) spacing of about 19 Å. X-ray analysis of the product showed an absence of basal reflection. The birefringent solid was extrudable at 120° C., producing a clear, colorless film. The birefringence is evidence of a liquid crystal structure, however, the spacing between the clay platelets is beyond the resolution of the laboratory defractometer (i.e., ~35 Å).

Example 5

This example illustrates the direct production of a liquid crystal film from a highly concentrated aqueous suspension. A Wyoming montmorillonite was purified according the pseudophasic extraction process as follows The clay feed was dispersed in hot tap water at 40° C. for 15 min., and the ammonium salt of the dispersant Dequest 2010 (a product of Solutia) was added to complete the dispersion of the ore. The amount of dispersant added was 3 wt % relative to the weight of the clay. Poly(ethylene glycol) with a molecular weight of 1500 was added to the aqueous dispersion at a concentration of 30 wt % relative to the weight of the clay. The amount of poly(ethylene glycol) added was sufficient to produce a monolayer coating on the basal surfaces of the exfoliated clay particles. After mixing for 30 min., the slurry was passed through a decanting centrifuge to remove mineral impurities and unexfoliated clay. The surface of the hydrophilic clay composite was further modified to reduce the surface HLB by adding a sufficient amount of the ammonium salt of an ethylene acrylic acid copolymer (Michem® Prime 4990R) to produce a final clay/polymer ratio of 60/40. After mixing for 30 min., an amount of poly(ethylene oxide) with a molecular weight of approximately 6,000,000 was dispersed in deionized water and added to the slurry at a concentration sufficient to produce a final concentration of 1 wt % relative to the weight of the clay. The solids were flocculated by reduction of the slurry pH to about 3 with concentrated sulfuric acid. The excess water was decanted and the clay/polymer composite was washed with fresh tap water. When the material was rapidly dried in the form of a sheet with a hot air dryer it produced a flexible, transparent, and colorless liquid crystal composite that was hydrophobic and which could be folded and creased without breaking. This is an example of polymer adsorption through an oxonium ion that was generated by an ion exchange process after the polymer had already been adsorbed to a clay surface which was originally in the sodium form.

Example 6

This example illustrates the preparation of an extrudable liquid crystalline composite containing approximately 50 weight percent clay. The purified H-ion exchanged saponite slurry of Example 2 was combined with polyethylene-block-polyethylene glycol (melting point 106° C.) and heated to 120° C. in a sealed Teflon vessel for 1.5 h. The product slurry was then dried at 100° C. yielding an liquid crystalline composite composition of 50.9 weight percent clay, 18.3 weight percent, polyethylene glycol, 30.8 weight percent polyethylene-block-polyethylene glycol. The liquid crystalline composite produced a clear, colorless film when pressed at 120° C. and 10,000 psi.

Example 7

This example illustrates the preparation of a liquid crystal composite whose surface HLB value is modified by adsorption of a polymeric surfactant thereby making it extrudable when dispersed in hydrophobic polymeric systems such as poly(ethylene), poly(propylene) and various copolymers containing a polyolefin. A Wyoming montmorillonite was purified using the pseudophasic extraction method. The clay was dispersed in hot tap water at 40° C. for 15 min., and the ammonium salt of the dispersant Dequest® 2010 (a product of Solutia) was added to complete the dispersion of the montmorillonite. The amount of dispersant added was 3 wt % relative to the weight of the clay. Poly(ethylene glycol) with a molecular weight of 1500 was added to the aqueous dispersion at a concentration of 30 wt % relative to the weight of the clay. The amount of poly(ethylene glycol) added was sufficient to produce a monolayer coating on the basal surfaces of the exfoliated clay particles. After mixing for 30 min., the slurry was passed through a decanting centrifuge to remove mineral impurities and unexfoliated clay. The surface of the hydrophilic clay composite was further modified to enable dispersion in hydrophobic systems by adding a sufficient amount of the ammonium salt of an ethylene acrylic acid copolymer (Michem® Prime 4990R) to produce a final clay/polymer ratio of 60/40. A dry product was obtained by spray drying the slurry to a final moisture content of less than 2 wt %. The solids content of the slurry fed to the spray dryer was approximately 9.5 wt %. The highly purified state of the clay was demonstrated by the fact that the material produced a transparent film when dried.

Example 8

Figure 6:
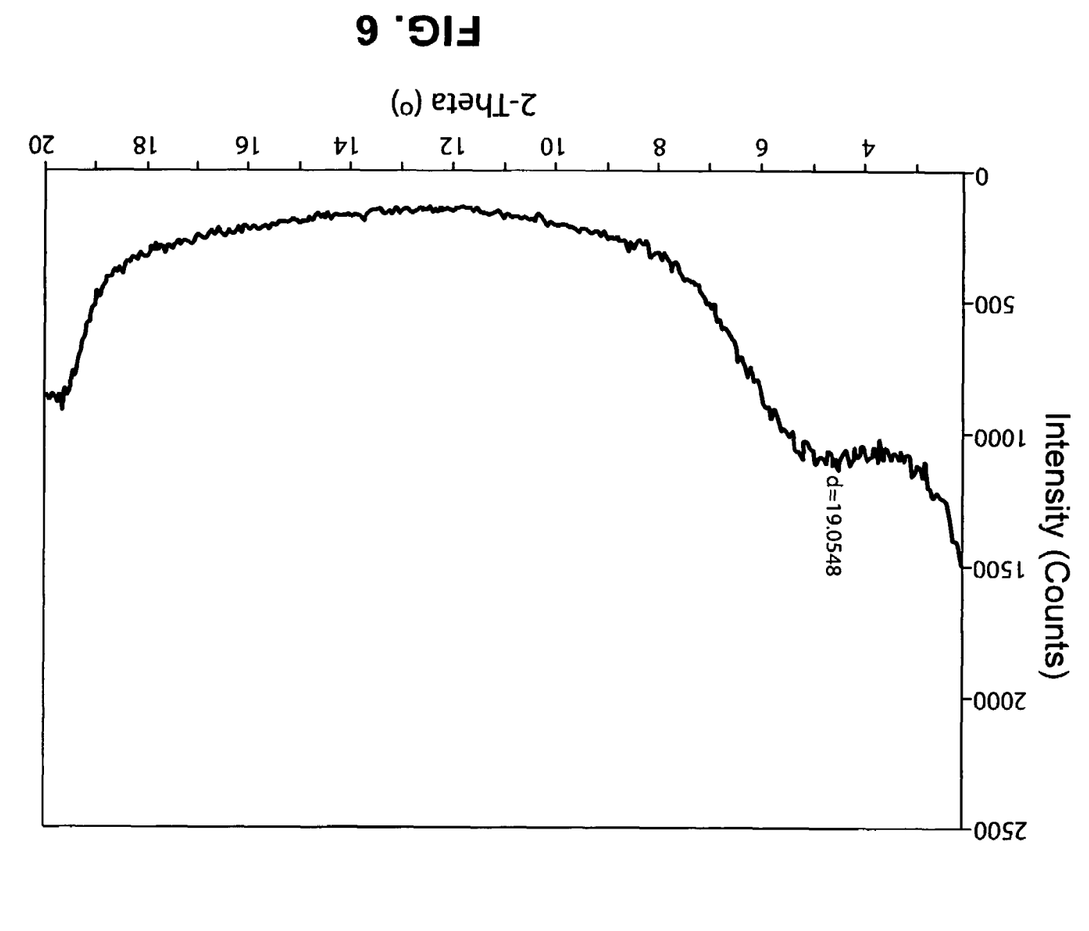
FIG. 6. X-ray diffraction pattern of a liquid crystalline composite containing 50 weight percent LAPONITE® clay and 50 weight percent polyethylene-block-polyethylene glycol.

This example illustrates the direct intercalation of polyethylene-block-polyethylene glycol (mw=1400) melt in a synthetic hectorite (i.e., LAPONITE® clay). The LAPONITE® clay and surfactant were blended at a 1:1 weight ratio, pressed into a pellet at 10,000 psi and heated to 125° C. for 1 h. This temperature is above the melting point of the surfactant which is 106° C. Expansion of the clay layers due to intercalation of the surfactant caused the monolith to crumble. The powder was repressed at 10,000 psi and heated to 125° C. for 16 h. The X-ray diffraction pattern shown in FIG. 6 exhibits a diffuse band of d(001) spacings beginning at approximately 17 Å and extending beyond the resolution of the defractometer (i.e., ~38 Å). The X-ray diffraction pattern of the liquid crystalline composite of this example is shown in FIG. 6.

The intercalation of the organic coating in examples 7 and 8 probably do not involve the proposed oxonium ion formation since the clay was in the sodium form. Accordingly, the present invention is not limited to phyllosilicate-polymer compositions which exhibit anomalous basal spacing. Intercalation of smectites with polymeric surfactants provides a direct route to the production of polyolefin-clay nanocomposites without the use of amine-based surfactants. Unlike the quaternary amine-based surfactants, which readily decompose via Hofmann elimination at 125° C. or higher, the polyethylene glycol-based surfactants exhibit melting points well below their decomposition points. Under anoxic conditions, the decomposition of polyethylene glycol, when intercalated within clay galleries, does not occur until approximately 360° C. In addition, the polyethylene glycol-based surfactants produce colorless intercalates and composites even at clay concentrations as high as 50–70 weight percent as opposed to quaternary amine-based materials which are generally yellow to brown due to amine degradation.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

While preferred embodiments have been illustrated and described, it should be understood that changes and modifications can be made therein in accordance with ordinary skill in the art without departing from the invention in its broader aspects as defined in the following claims.

What is claimed is:

1. A barrier film comprising an anisotropic liquid crystalline composite layer having a gas permeability below the gas permeability of a polymer in the liquid crystalline composite, wherein the liquid crystalline composite comprises a phyllosilicate and a polymer, the liquid crystalline composite layer further comprises a polyethylene glycol or polypropylene glycol based surfactant selected from polyethylene glycol/polyethylene copolymer, polyethylene-block-polyethylene glycol polymer, or polypropylene-block-polyethylene glycol polymer, and the liquid crystal composite is a blend with a polyolefin.

2. The barrier film of claim 1 wherein the film is transparent.

3. The barrier film of claim 1, wherein the phyllosilicate comprises greater than ten percent by weight of the liquid crystalline composite layer.

4. The barrier film of claim 3 wherein the phyllosilicate comprises between about 30 and about 70 percent by weight of the liquid crystalline composite layer.

5. The barrier film of claim 1 wherein the liquid crystalline composite layer comprises an inner layer of a multilayer film.

6. The barrier film of claim 1 wherein the polyolefin is polyethylene.

7. The barrier film of claim 1, wherein said polyethylene glycol polymer based surfactant is polyethylene-block-polyethylene glycol polymer.

8. The barrier film of claim 1, wherein said polypropylene glycol polymer based surfactant is polypropylene-block-polyethylene glycol polymer.

9. A barrier film comprising an anisotropic liquid crystalline composite layer wherein the liquid crystal composite comprises a phyllosilicate and a polymer and wherein the polymer is polyethylene glycol, polypropylene glycol or monoalkyl ethers thereof; and wherein the liquid crystal composite is birefringent, wherein the liquid crystalline composite layer further comprises a polyethylene glycol or polypropylene glycol based surfactant selected from polyethylene glycol/polyethylene copolymer, polyethylene-block-polyethylene glycol polymer, or polypropylene-block polyethylene glycol polymer, and the liquid crystal composite is a blend with a polyolefin.

10. The barrier film of claim 9 wherein the phyllosilicate is nematically oriented in the liquid crystal composite layer.

11. The barrier film of claim 9 wherein the phyllosilicate is selected from the group consisting of kaolins, talcs and montmorillonites.

12. The barrier film of claim 9 further comprising an antioxidant.

13. The barrier film of claim 9 wherein the film is transparent.

14. The barrier film of claim 9 wherein the phyllosilicate comprises greater than ten percent by weight of the liquid crystalline composite layer.

15. The barrier film of claim 9 wherein the phyllosilicate comprises between about 30 and about 70 percent by weight of the liquid crystalline composite layer.

16. The barrier film of claim 9 wherein the liquid crystalline composite further comprises an antioxidant and a polyolefin or polyethylene terephthalate.

17. A method of making a barrier film comprising extruding a liquid crystalline composite of claim 12 to form the liquid crystalline composite layer.

18. A method of making a barrier film comprising extruding a liquid crystalline composite of claim 16 to fonn the liquid crystalline composite layer.

19. The barrier film of claim 9, wherein said polyethylene glycol polymer based surfactant is polyethylene-block-polyethylene glycol polymer.

20. The barrier film of claim 9, wherein said polypropylene glycol polymer based surfactant is polypropylene-block-polyethylene glycol polymer.

21. The barrier film of claim 9, wherein the polyolefin is polyethylene.

* * * * *

UNITED STATES PATENT AND TRADEMARK OFFICE
CERTIFICATE OF CORRECTION

PATENT NO.      : 7,214,734 B2                                    Page 1 of 1
APPLICATION NO. : 10/863617
DATED           : May 8, 2007
INVENTOR(S)     : David J. Chaiko

It is certified that error appears in the above-identified patent and that said Letters Patent is hereby corrected as shown below:

On the title page item (56), line 11, Other Publications:  Delete "Hasagawa" and replace with --Hasegawa--.

Column 14, Line 2:  Delete "fonn" and replace with --form--.

Signed and Sealed this

Nineteenth Day of June, 2007

JON W. DUDAS
*Director of the United States Patent and Trademark Office*